(12) United States Patent
Bootka

(10) Patent No.: US 6,810,902 B2
(45) Date of Patent: Nov. 2, 2004

(54) AUTOMATIC WATER SHUT OFF SYSTEM TO PREVENT OVERFLOW OF A PLUMBING DEVICE

(76) Inventor: Anthony M. Bootka, 52155 Dorchester La., Shelby Township, MI (US) 48316

( * ) Notice: Subject to any disclaimer, the term of this patent is extended or adjusted under 35 U.S.C. 154(b) by 0 days.

(21) Appl. No.: 10/341,632

(22) Filed: Jan. 14, 2003

(65) Prior Publication Data

US 2004/0007264 A1 Jan. 15, 2004

Related U.S. Application Data

(60) Provisional application No. 60/395,512, filed on Jul. 12, 2002.

(51) Int. Cl.[7] .................. F16K 31/02; E03C 1/232; E03C 1/242; E03D 11/02
(52) U.S. Cl. ............... 137/312; 4/366; 4/395; 4/415; 4/427; 4/668; 137/2; 137/392; 340/605; 340/620
(58) Field of Search ............... 122/504, 504.2, 122/507; 137/312, 387, 392, 486, 487.5, 2; 4/367, 406, 407, 415, 427, 559, 661, 668, 366, 405; 307/118; 340/605, 620; 261/178; 782/51; 73/40, 405 R

(56) References Cited

U.S. PATENT DOCUMENTS

| | | | |
|---|---|---|---|
| 2,991,481 A | * | 7/1961 | Book ............... 4/553 |
| 3,121,880 A | | 2/1964 | Gelhar |
| 3,770,002 A | * | 11/1973 | Brown ............ 137/312 |
| 3,874,403 A | * | 4/1975 | Fischer ............ 137/392 |
| 4,203,173 A | | 5/1980 | Morris et al. |
| 4,324,268 A | * | 4/1982 | Jacobson ........... 137/312 |
| 4,380,243 A | * | 4/1983 | Braley ............. 137/312 |
| 4,380,835 A | | 4/1983 | Yao |
| 4,563,780 A | * | 1/1986 | Pollack ............ 137/392 |
| 4,709,427 A | | 12/1987 | Laverty, Jr. |
| 4,796,658 A | * | 1/1989 | Caple ............. 137/312 |
| 5,036,553 A | | 8/1991 | Sanderson |
| 5,056,554 A | | 10/1991 | White |
| 5,161,563 A | * | 11/1992 | Thompson ......... 137/487.5 |
| 5,315,291 A | * | 5/1994 | Furr ................ 340/605 |
| 5,357,241 A | * | 10/1994 | Welch, Jr. et al. ...... 340/605 |
| 5,441,070 A | * | 8/1995 | Thompson ......... 137/487.5 |
| 5,632,302 A | * | 5/1997 | Lenoir, Jr. ......... 137/312 |
| 5,731,758 A | | 3/1998 | Suttlemyre et al. |
| 5,881,762 A | * | 3/1999 | Janesky ............ 137/312 |
| 5,940,899 A | * | 8/1999 | Mankin et al. ......... 4/427 |
| 5,992,218 A | * | 11/1999 | Tryba et al. .......... 340/605 |
| 6,052,841 A | * | 4/2000 | Mankin et al. ......... 4/427 |
| 6,058,519 A | * | 5/2000 | Quintana ............ 4/427 |
| 6,125,870 A | * | 10/2000 | Furmanek ........... 137/387 |
| 6,135,133 A | * | 10/2000 | Ridgeway, Jr. ......... 137/312 |
| 6,178,569 B1 | * | 1/2001 | Quintana ............ 4/427 |
| 6,186,162 B1 | * | 2/2001 | Purvis et al. ......... 137/312 |

* cited by examiner

*Primary Examiner*—George L. Walton
(74) *Attorney, Agent, or Firm*—Kevin G. Mierzwa

(57) ABSTRACT

A control circuit for a plumbing device that has a drain line and a water supply line includes a water sensor generating a potential overflow level signal in response to the water level in the plumbing device caused from a restricted drain line, an electrically controlled valve coupled to the drain line, and a controller coupled to the water sensor and the valve. The controller closes the valve in response to the potential overflow level signal.

13 Claims, 2 Drawing Sheets

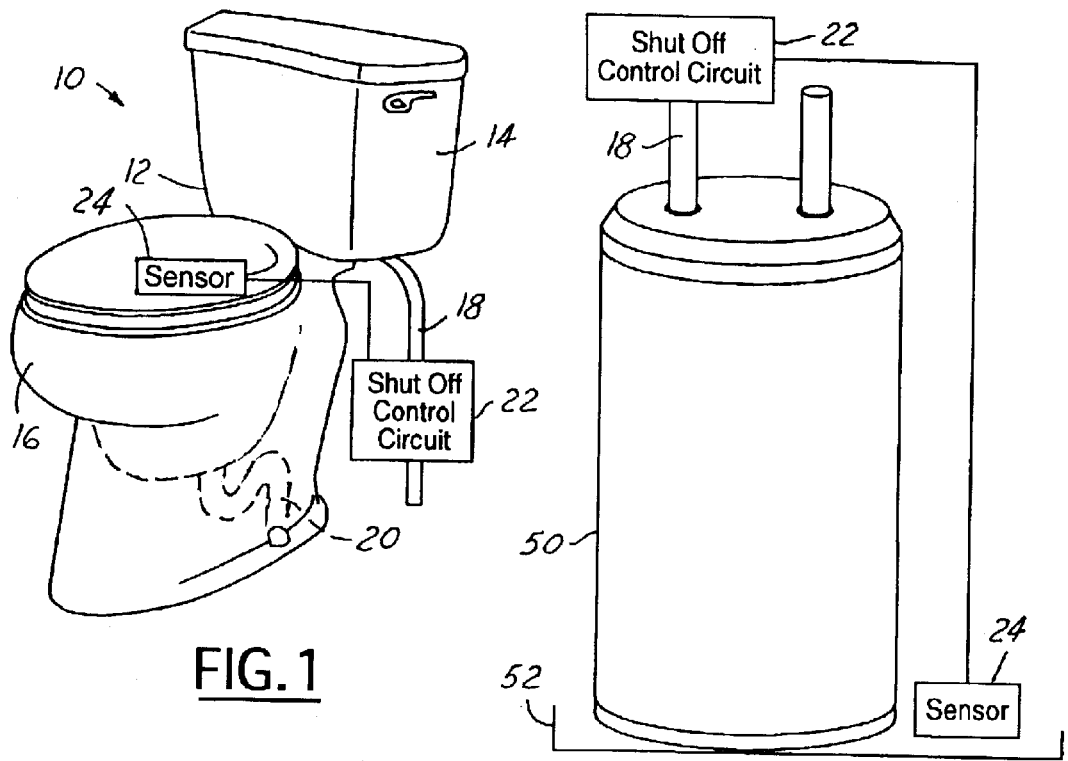
FIG. 1
FIG. 4
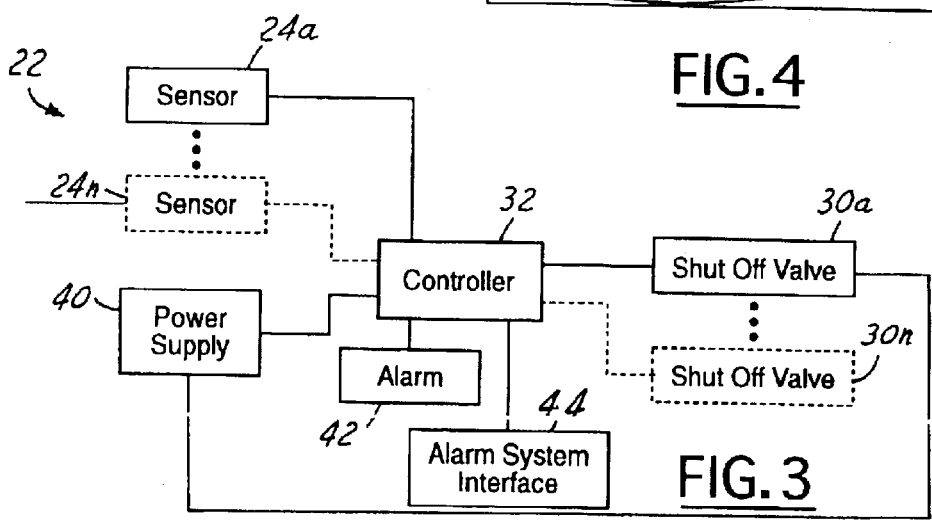
FIG. 3
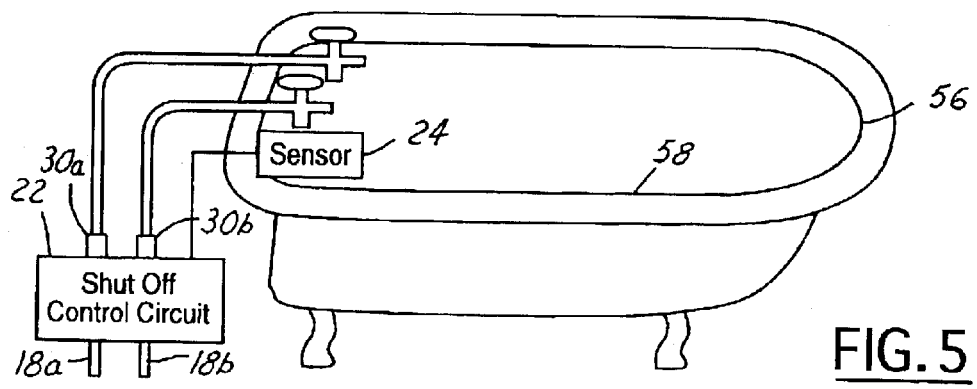
FIG. 5

AUTOMATIC WATER SHUT OFF SYSTEM TO PREVENT OVERFLOW OF A PLUMBING DEVICE

The present invention claims priority to U.S. provisional application No. 60/395,512, filed on Jul. 12, 2002.

TECHNICAL FIELD

The present invention relates generally to plumbing devices, and more particularly to a system for preventing the overflow of the plumbing device.

BACKGROUND ART

The damage caused from the overflow of plumbing devices can be very expensive. Plumbing devices such as toilets and bathtubs may overflow if their drains are plugged. Damage can be multiplied if the devices are in multi-unit dwellings, since the damage may extend several floors below. A typical device has a supply line that provides water thereto. Typically, the water supply continues to operate even if a malfunction such as a plugged drain is present.

A system for controlling the operation of a toilet is described in U.S. Pat. No. 5,731,758. In this patent, several sensors are located within the toilet tank for detecting the level of water therein. When the water reaches a shut off level within the tank, the supply line is shut off. This system is meant to replace the ball float-type systems in a toilet. Although the system illustrates a floor water probe, overflowing water from the bowl is not shut off until detected by the sensor 22. Thus, some leakage does occur in the '758 patent allowing for the potential for damage.

It would therefore be desirable to provide a device that shuts off the water supply to a plumbing device prior to overflowing of the plumbing device.

SUMMARY OF THE INVENTION

The present invention provides an overflow shut off control circuit for a plumbing device.

In one aspect of the invention a control circuit for a plumbing device that has a drain line and a water supply line includes a water sensor generating a potential overflow level signal in response to the water level in the plumbing device caused from a restricted drain line, an electrically controlled valve coupled to the drain line, and a controller coupled to the water sensor and the valve. The controller closes the valve in response to the potential overflow level signal.

A control circuit for a toilet assembly having a toilet bowl having a rim and a water supply includes a water sensor disposed adjacent to the rim. The water sensor generates a water level signal in response to the water level in the bowl.

In yet another aspect of the invention a method of operating a plumbing device includes the steps of detecting a potential overflow from a plumbing device, and closing a valve in a supply line in response to the step of detecting.

One advantage of the invention is that property damage to a continually operating plumbing device is reduced. Such a device would be particularly useful in multi-unit dwellings. Another advantage is that if the plumbing device is defective such as a bad flap valve, the presence of water will cause the flow of water to be stopped. This also saves water.

A further advantage of the invention is that natural resources such as water are reduced in the operation or failure of the plumbing devices.

Other aspects and advantages of the present invention will become apparent upon the following detailed description and appended claims, and upon reference to the accompanying drawings.

BRIEF DESCRIPTION OF THE DRAWINGS

FIG. 1 is a perspective view of a toilet having a shut off control circuit according to the present invention.

FIG. 3 is a block diagrammatic view of the control circuit according to the present invention.

FIG. 4 is a perspective view of a water heater having a circuit according to the present invention.

FIG. 5 is a perspective view of a bathtub having a control circuit according to the present invention.

BEST MODES FOR CARRYING OUT THE INVENTION

Figure 2:
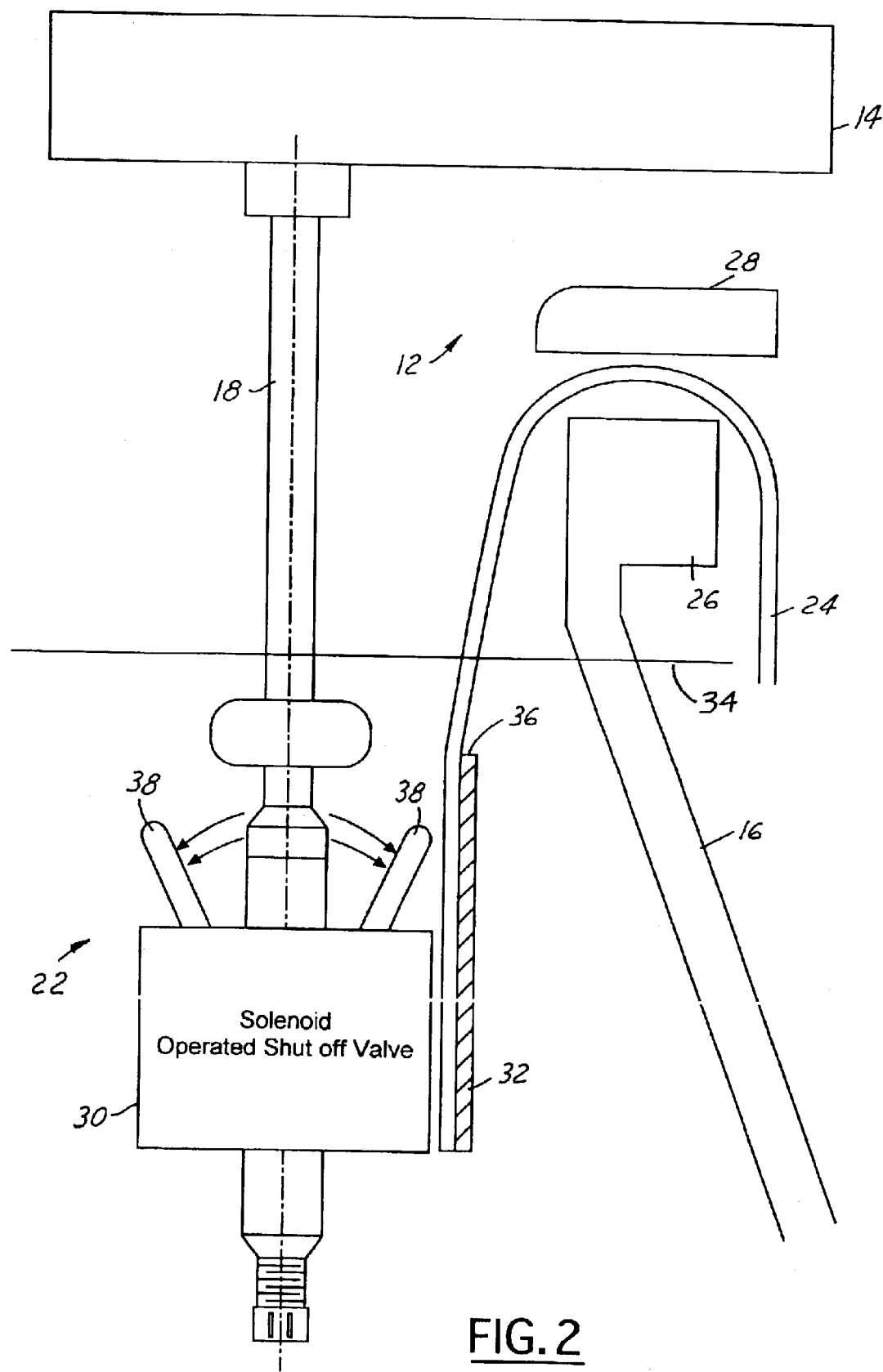
FIG. 2 is a partial cross-sectional block diagrammatic view of a control circuit according to the present invention.

In the following figures the same reference numerals will be used to identify the same components.

While a limited number of plumbing devices such as a toilet, water heater and bathtub are illustrated, the present invention may apply to other types of plumbing devices.

Referring now to FIG. 1, a plumbing device 10 is illustrated as a toilet 12 that has a tank 14 and a toilet bowl 16. The toilet tank has a supply line 18 that supplies water to the tank 14. A drain line 20 is used to remove waste from the toilet bowl 16. A shut off control circuit 22 is illustrated coupled to a sensor 24. Shut off control circuit 22 is used to close the supply line 18 to prevent supply water from reaching tank 14. A control circuit 22 operates in response to sensor 24 detecting a level of water that may cause an overflow of the toilet bowl 16.

Referring now to FIG. 2, toilet 12 and control circuit 22 are illustrated in further detail. Toilet bowl 16 has a rim 26 and seat 28.

Control circuit 22 includes an electrically operated valve such as a solenoid operated shut off valve 30. Preferably, shut off valve 30 is normally open so that water freely flows through supply line 18. Of course the shut off valve could be normally closed. Solenoid operated valve 30 is operated in response to a controller 32. Controller 32 may be microprocessor-based. Controller 32 may also be formed of discrete circuitry. Various types of control circuits would be evident to those in the art. Controller 32 is coupled to sensor 24 used to sense the level of water within toilet bowl 16. Sensor 24 is preferably positioned adjacent to rim 26 not touching or away from the sides of the bowl in a position at or above the normal water level 34. This allows prevention of the overflow of the toilet bowl 16. Thus, sensor 24 generates a potential overflow level signal in response to the level of water within the toilet bowl 16 that corresponds to a potential for overflow. When the level reaches sensor 24, the circuit is continued through the sensor (continuity) to indicate a restricted drain line 20 shown in FIG. 1. The sensor 24 may also be integrally formed within toilet bowl 16 or positioned between seat 28 and rim 26 in an aftermarket type application. Controller 32 may be disposed on a circuit board 36.

Solenoid operated shut off valve 30 may also include manually operated levers 38 to turn on the flow of water to the plumbing device. Levers 38 allow the solenoid operated valve to be open if power is discontinued from the device such as in a power failure.

Referring now to FIG. 3, a block diagrammatic view of shut off control circuit 22 is illustrated. Shut off control circuit 32 may have a central controller and a central power supply 40. The shut off control circuit 22 may include a common controller 32 and a power supply 40 for a number (n) of sensors 24a–25n and a number (n) of shut off valves 30a–30n. The various sensors 24 and shut off valves 30 may be associated with various types of plumbing devices such as toilet-type devices such as a toilet, urinal or bidet. For example, in a commercial application both men and ladies restrooms may include several sensors and several shut off valves that use a central controller 32 and power supply 40.

The power supply 40 may, for example, be a 24-volt DC source. Such a source is transformed down from the power source from the building. Those skilled in the art will also recognize various types of solenoids using various types of power supplies may also be incorporated into the device.

Controller 32 may also be coupled to an alarm 42 that generates an audible or visual alarm in response to the level of water in the plumbing device. In addition, controller 32 may be coupled to an alarm system interface 44. Alarm system interface 44 may act to notify a central controller so that help may be dispatched from a central monitoring system.

In operation, the sensors upon sensing a level of water that contacts sensors 24, a valve 30 is shut off by shut off control circuit 22.

Referring now to FIG. 4, a hot water tank 50 is illustrated having a shut off control circuit 22 and sensor 24 formed according to the present invention. Thus, as sensor 24 detects the presence of water in a pan 52 positioned beneath hot water tank 50, sensor 24 initiates the shut off of supply line 18 through shut off control circuit 22.

Referring now to FIG. 5, a bathtub 56 is illustrated. Bathtub 56 has a rim 58 disposed thereon. A sensor 24 is positioned adjacent to rim 58 within the bathtub 56. Shut off control circuit 22 may operate two control valves 30A, 30B in response to one sensor 24. This allows both the hot and cold supply lines 18a and 18b to be shut off to prevent overflow of bathtub 56.

As can be seen above, various advantages of the invention are inherent in such device. First, the reduced amount of water or no water due to a malfunctioning plumbing device is present. Second, because of the reduced amount of water the damage associated therewith, particularly in multi-unit dwellings, is substantially reduced.

As mentioned above, another advantage is that if the plumbing device is defective such as a bad flap valve for a toilet, water leaking into the bowl from the tank may be detected by the user upon a flush attempt. The presence of water in the bowl will cause the supply of water to the toilet tank to be stopped. This also saves water and may alert the premises owner to the defect while reducing the amount of water used and reducing the water bill.

Those skilled in the art will also recognize that various other types of plumbing devices such as laundry tubs, sinks, washing machines and the like may also benefit from the present invention.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A toilet assembly having a drain line and a water supply line comprises:

a toilet tank coupled to the supply line;

a toilet bowl;

a water sensor disposed within the toilet bowl generating a potential overflow level signal in response to the water level in the bowl caused from a restriction in the drain line;

an electrically controlled valve coupled the supply line; and a controller coupled to the water sensor and the valve, said controller closing the valve in response to a potential overflow level signal.

2. A control circuit as recited in claim 1 wherein the water sensor is an electrical water sensor.

3. A control circuit as recited in claim 1 wherein said water sensor is disposed within the bowl adjacent to a rim.

4. A control circuit as recited in claim 1 wherein said water sensor comprises a continuity sensor.

5. A control circuit as recited in claim 1 wherein said valve has a manually operated override.

6. A control circuit as recited in claim 1 further comprising an alarm coupled to said controller, said alarm operated in response to said potential overflow level signal.

7. A control circuit as recited in claim 1 further comprising an alarm interface coupled to said controller, said alarm interface operated in response to said potential overflow level signal.

8. A control circuit for toilet assembly having a toilet bowl, a toilet tank and a water supply line supplying water to the tank comprising:

a water sensor disposed within the bowl, said water sensor generating a water level signal in response to the water level in the bowl;

an electrically controlled valve coupled the supply line; and a controller coupled to the water sensor and the valve, said controller controlling the valve in response to the water level signal to prevent water from flowing into the tank.

9. A control circuit as recited in claim 8 wherein the water sensor is an electrical water sensor.

10. A control circuit as recited in claim 8 wherein said water sensor comprises a continuity sensor.

11. A control circuit as recited in claim 8 wherein said valve has a manually operated override.

12. A method of operating a toilet assembly comprising:

detecting a potential overflow of a toilet bowl from a sensor positioned in the toilet bowl; and closing a valve in a supply line to a toilet tank in response to the step of detecting.

13. A method as recited in claim 12 further comprising manually opening the valve.

* * * * *

UNITED STATES PATENT AND TRADEMARK OFFICE
CERTIFICATE OF CORRECTION

| | |
|---|---|
| PATENT NO. | : 6,810,902 B2 |
| APPLICATION NO. | : 10/341632 |
| DATED | : November 2, 2004 |
| INVENTOR(S) | : Anthony M. Bootka |

It is certified that error appears in the above-identified patent and that said Letters Patent is hereby corrected as shown below:

Column 4
Claim 1, lines 11-19, should read as follows: -- a water sensor disposed within the toilet bowl at a normal water level generating a level signal in response to the normal water level in the plumbing device bowl;
an electrically controlled normally-closed valve coupled to the supply line; and
a controller coupled to the water sensor and the normally-closed valve, said controller opening the valve in response to the level signal indicating the water level below the normal water level when the toilet assembly has been flushed and closing the valve in response to the water level signal indicating the water level being at the normal water level after a flush so that water loss is minimized when a defective flap valve is detected by a user during another flush due to an absence of water in the toilet tank. --

Claim 3, Lines 22-23 --delete --

Claim 6, Line 30, should read as follows: -- in response to said level signal. --

Claim 7, Line 33, should read as follows: -- interface operated in response to said level signal. --

Claim 8, lines 38-45, should read as follows: -- a water sensor disposed within the bowl at a normal water level, said water sensor generating a water level signal in response to the water level in the bowl;
a normally closed electricall controlled valve coupled to the supply line; and
a controller coupled to the water sensor and the valve, said controller opening the valve in response to the water level signal indicating the water level below the normal water level when toilet assembly has been flushed and closing the valve in response to the water level signal indicating the water level being at the normal water level after a flush so that water loss is minimized when a defective flap valve is detected by a user during another flush due to an absence of water in the toilet tank. --

UNITED STATES PATENT AND TRADEMARK OFFICE
CERTIFICATE OF CORRECTION

PATENT NO. : 6,810,902 B2
APPLICATION NO. : 10/341632
DATED : November 2, 2004
INVENTOR(S) : Anthony M. Bootka It is certified that error appears in the above-identified patent and that said Letters Patent is hereby corrected as shown below:

Claim 12, Lines 52-56, should read as follows: -- A method of operating a toilet assembly having a toilet bowl, toilet tank and supply line coupled to the tank, the method comprising:
detecting a water level in the toilet bowl from a sensor positioned at a normal water level in the toilet bowl; and
opening a vale in the supply line to the toilet tank in response to the water level indicative of the water below the normal water level when toilet assembly has been flushed and closing the valve in response to the water level being at the normal water level so that water loss is minimized when a defective flap valve is detected by a user during another flush due to an absence of water In the toilet tank.--

Signed and Sealed this

Twenty-fourth Day of April, 2007

JON W. DUDAS
*Director of the United States Patent and Trademark Office*